(12) United States Patent
Chauhan et al.

(10) Patent No.: US 11,418,493 B2
(45) Date of Patent: Aug. 16, 2022

(54) IDENTIFYING AND SECURING UNENCRYPTED DATA IN A PRODUCTION ENVIRONMENT

(71) Applicant: Bank of America Corporation, Charlotte, NC (US)

(72) Inventors: Sandeep Kumar Chauhan, Hyderabad (IN); Amit Kumar Singhal, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 294 days.

(21) Appl. No.: 16/534,627

(22) Filed: Aug. 7, 2019

(65) Prior Publication Data

US 2021/0044573 A1 Feb. 11, 2021

(51) Int. Cl.
*H04L 9/40* (2022.01)
*G06F 21/62* (2013.01)
*H04W 12/033* (2021.01)

(52) U.S. Cl.
CPC ...... *H04L 63/0428* (2013.01); *G06F 21/6245* (2013.01); *H04W 12/033* (2021.01)

(58) Field of Classification Search
CPC combination set(s) only.
See application file for complete search history.

(56) References Cited

U.S. PATENT DOCUMENTS

| | | | |
|---|---|---|---|
| 7,546,334 B2 * | 6/2009 | Redlich | G06F 21/6263 709/219 |
| 7,552,482 B2 | 6/2009 | Redlich et al. | |
| 9,635,011 B1 * | 4/2017 | Wu | H04L 9/3242 |
| 2006/0026669 A1 | 2/2006 | Zakas | |
| 2013/0019104 A1 | 1/2013 | Halas et al. | |
| 2013/0166657 A1 * | 6/2013 | Tadayon | G06Q 10/107 709/206 |
| 2016/0078245 A1 * | 3/2016 | Amarendran | G06N 20/00 713/193 |
| 2016/0117518 A1 * | 4/2016 | Cao | G06F 21/6209 713/165 |
| 2016/0204937 A1 * | 7/2016 | Edwards | G16H 10/60 713/168 |
| 2016/0210470 A1 * | 7/2016 | Rozenberg | G06F 16/284 |
| 2018/0351733 A1 * | 12/2018 | Rohel | H04L 63/0428 |
| 2020/0314068 A1 * | 10/2020 | Werner | G06F 40/30 |
| 2021/0044573 A1 * | 2/2021 | Chauhan | H04L 63/0428 |

* cited by examiner

*Primary Examiner* — Harris C Wang
(74) *Attorney, Agent, or Firm* — Banner & Witcoff, Ltd.

(57) ABSTRACT

Aspects of the disclosure relate to identification of confidential data, in a message, and encryption of the confidential data. A computing platform may determine, based on a knowledge base, confidential data in a first message transmitted over one or more computing networks. The computing platform may encrypt the confidential data in the message. The computing platform may generate a second message based on encrypted confidential data. Further, the computing platform may update a header, corresponding to the second message, to indicate an encryption technique used for the encrypted confidential data. The computing platform may further encrypt the header of the second message, and transmit the second message.

20 Claims, 5 Drawing Sheets

IDENTIFYING AND SECURING UNENCRYPTED DATA IN A PRODUCTION ENVIRONMENT

FIELD

Aspects described herein generally relate to computer systems and networks. More specifically, aspects of this disclosure relate to use of encryption for enhancing computer and data security.

BACKGROUND

Computing systems of enterprise organizations often process sensitive personal information and communicate such information to other systems. Processing, transfer, and/or storage of such data, within a computing system or using multiple computing systems, may expose the data to potential misuse. Thus, there is a need to securely communicate and/or store such information.

SUMMARY

Aspects of the disclosure provide security solutions that address and overcome technical problems associated with identification, encryption, storage, and transfer of confidential information. In particular, one or more aspects of the disclosure relate to use of an adaptive filter to identify confidential information, and an adaptive handler to apply an appropriate encryption to identified confidential information. Other aspects of the disclosure relate to use of a mapping schema to enable a security platform to process information encrypted previously.

In accordance with one or more arrangements, a computing platform having at least one processor, a communication interface, and memory may receive, via the communication interface and from a data source system, a first message. The first message may comprise a first portion of the first message and a second portion of the first message. The computing platform may determine, based on a knowledge base, that at least the first portion of the first message comprises first confidential data that is eligible for encryption. The computing platform may encrypt, using a first encryption technique and based on determining that at least the first portion of the first message comprises the first confidential data that is eligible for encryption, the first portion of the first message to generate an encrypted first portion. The computing platform may generate, using the encrypted first portion and the second portion of the first message, a second message. The computing platform may generate a header corresponding to the second message. The header may comprise a first indicator of the first encryption technique. The computing platform may encrypt, using a second encryption technique, the header corresponding to the second message. The computing platform may transmit, via the communication interface and to a data destination system, the second message.

In some arrangements, the computing platform may receive, prior to receiving the first message, a third message. The computing platform may determine, based on an indicator in the third message, that at least a portion of the third message comprises second confidential data that is eligible for encryption. The computing platform may determine one or more first characteristics of the portion of the third message, and update the knowledge base with the one or more first characteristics.

In some arrangements, the one or more first characteristics comprise one or more of: a data source system corresponding to the portion of the third message, a data destination system corresponding to the portion of the third message, a format corresponding to the portion of the third message, and a classification of corresponding to the portion of the third message.

In some arrangements, determining that the first portion of the first message comprises the first confidential data that is eligible for encryption comprises determining one or more second characteristics of the first portion of the first message and determining that at least one second characteristic is similar to at least one first characteristic. The computing platform may update the knowledge base with the at least one second characteristic.

In some arrangements, determining that the first portion of the first message comprises the first confidential data that is eligible for encryption comprises determining one or more second characteristics of the first portion of the first message, and determining that at least one second characteristic is an updated version of at least one first characteristic. The computing platform may update the knowledge base with the at least one second characteristic.

In some arrangements, determining that at least the first portion of the first message comprises the first confidential data that is eligible for encryption comprises at least one of: determining that the first portion of the first message comprises a pattern of bits, and determining that the first message comprises a second indicator. The second indicator may, for example, indicate that the first portion of the first message comprises the first confidential data.

In some arrangements, the knowledge base may comprise one or both of the pattern of bits and the second indicator.

In some arrangements, determining that at least the first portion of the first message comprises the first confidential data that is eligible for encryption comprises determining that the first portion of the first message is encrypted below a threshold level of encryption.

In some arrangements, encrypting the first portion of the first message comprises determining, a level of encryption to be applied and encrypting the first portion of the first message based on the determined level of encryption.

In some arrangements, the first encryption technique is the same as the second encryption technique.

In some arrangements, the second message may comprise a second indicator corresponding to the first portion of the first message. The second indicator may indicate at least one of: the data source system of the first message, the data destination system of the second message, a format of the first portion of the first message, and a format of the encrypted first portion.

In some arrangements, transmitting, to the data destination system, the second message comprises transmitting the second message for storage at a storage device. The computing platform may retrieve, via the communication interface, the second message from the storage device. The computing platform may decrypt the header corresponding to the second message and determine, based on the first indicator, the first encryption technique. The computing platform may decrypt, based on the first indicator, the encrypted first portion to generate a decrypted first portion. The computing platform may identify, based on the second indicator, at least one of: the data source system of the first message, the data destination system of the second message, the format of the first portion of the first message, and the format of the encrypted first portion.

In some arrangements, encrypting the first portion of the first message comprises adding enrichment information to the first portion of the first message. The computing platform may encrypt the first portion of the first message and the enrichment information to generate the encrypted first portion.

In some arrangements, the second indicator may indicate at least one of: a length of the enrichment information, a type of the enrichment information, a format of the enrichment information, a location of the enrichment information in the first portion of the first message, and a value of the enrichment information.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for securing confidential data. Training messages may be used to train a security platform to identify confidential data (e.g., protected data, personal data, health data, classified information, or the like), or other data to be secured. The security platform may update, based on the training data, a corresponding knowledge base. Information in the knowledge base may be used to identify confidential data (e.g., in later messages). The security platform may identify, using the knowledge base, confidential data within a later message (e.g., that is transmitted or stored within the network). The security platform may encrypt the identified confidential data within the later message, and further encrypt the header associated with the later message. The security platform may further associate the later message with a schema identifier. During decryption, the schema identifier may be used to parse and/or identify confidential data in a message.

Figure 1A:
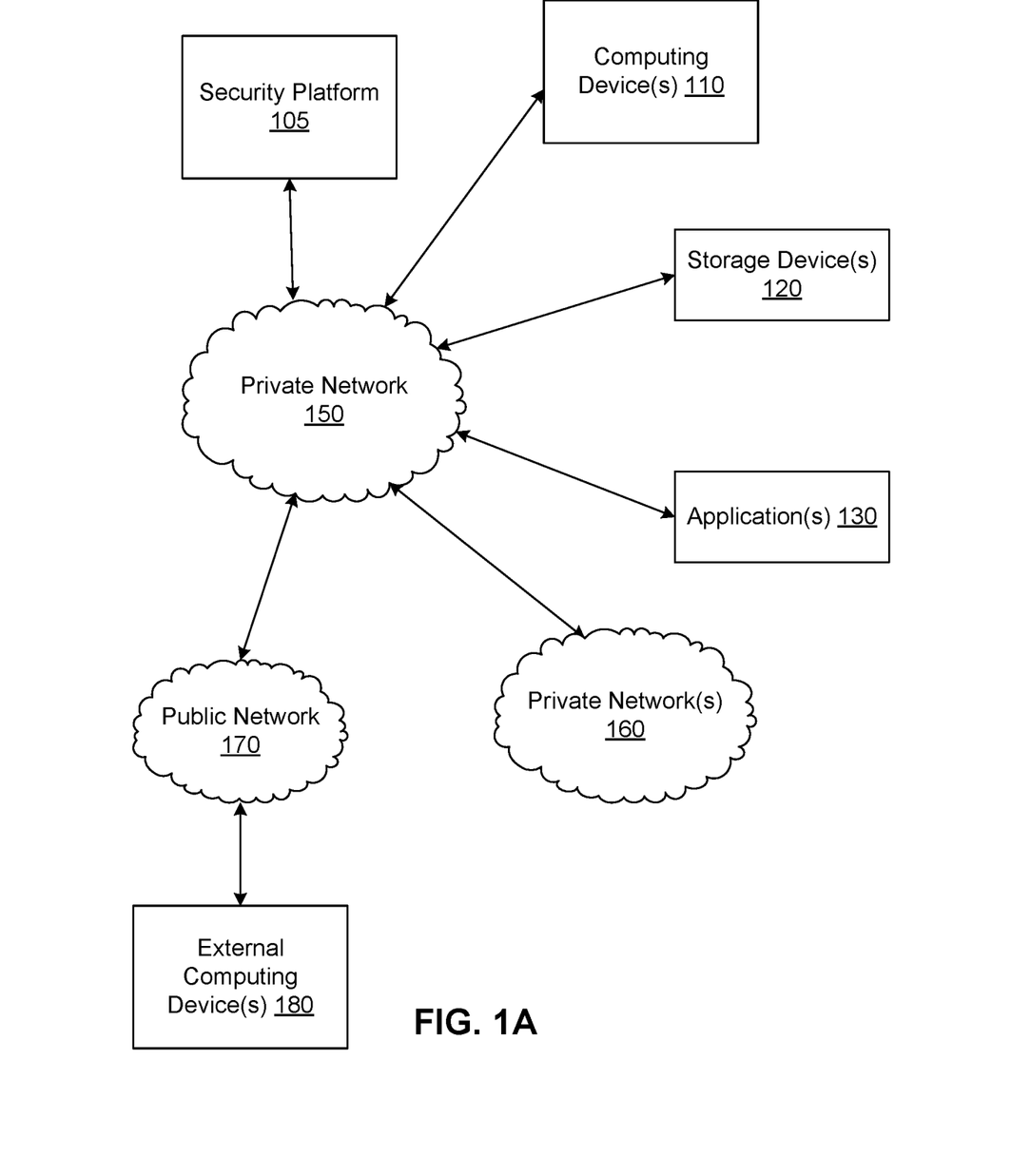
FIGS. 1A and 1B depict an illustrative computing environment for identifying and securing confidential data, in accordance with one or more example arrangements.
Figure 1B:
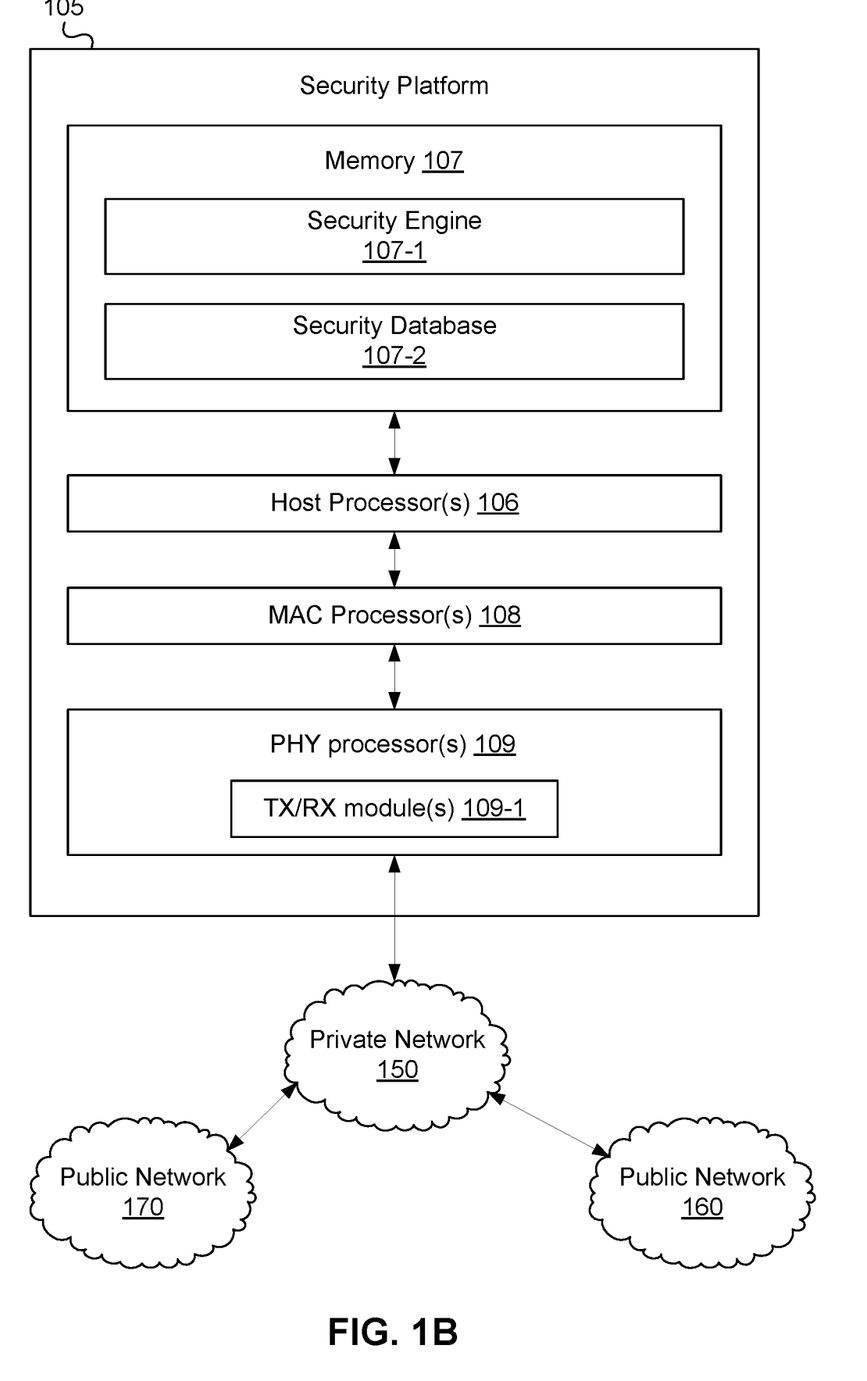

FIGS. 1A and 1B depict an illustrative computing environment for identifying and securing confidential data, in accordance with one or more example arrangements. Referring to FIG. 1A, a computing environment 100 may comprise one or more devices (e.g., computer systems, communication devices, servers). The computing environment 100 may comprise, for example, a security platform 105, computing device(s) 110, and storage device(s) 120 linked over a private network 150. Application(s) 130 may operate on one or more computing devices or servers associated with a private network 150.

The computing environment 100 may comprise one or more networks (e.g., public networks and/or private networks), which may interconnect one or more of the security platform 105, the computing device(s) 110, the storage device(s) 120, and/or one or more other devices and servers. One or more applications 130 may operate on one or more devices in the computing environment. The networks may use wired and/or wireless communication protocols. The private network 150 may be associated with, for example, an enterprise organization. The private network 150 may interconnect the security platform 105, the computing device(s) 110, the storage device(s) 120, and/or one or more other devices/servers which may be associated with the enterprise organization. The private network 150 may be linked to other private network(s) 160 and/or the public network 170. The private network 150 and the private network(s) 160 may correspond to, for example, a local area network (LAN), a wide area network (WAN), a peer-to-peer network, or the like.

A user in a context of the computing environment 100 may be, for example, an associated user (e.g., an employee, an affiliate, or the like) of the enterprise organization operating/associated. An external user (e.g., a client) may avail services being provided by the enterprise organization, and access one or more resources located within the private network 150 (e.g., through the public network 160). Users may operate one or more devices in the computing environment 100 to send messages to and/or receive messages to one or more other devices connected to the computing environment 100. An enterprise organization may correspond to any government or private institution, an educational institution, a financial institution, health services provider, retailer, or the like.

As illustrated in greater detail below, the security platform 105 may comprise one or more computing devices configured to perform one or more of the functions described herein. The security platform 105 may comprise, for example, one or more computers (e.g., laptop computers, desktop computers, servers, server blades, or the like).

The computing device(s) 110 may comprise one or more of an enterprise application host platform, an enterprise user computing device, an administrator computing device, and/or other computing devices, platforms, and servers associated with the private network 150. The enterprise application host platform(s) may comprise one or more computing devices and/or other computer components (e.g., processors, memories, communication interfaces). The enterprise application host platform may be configured to host, execute, and/or otherwise provide one or more enterprise applications. The enterprise application host platform(s) may be configured, for example, to host, execute, and/or otherwise provide one or more transaction processing programs, user servicing programs, and/or other programs associated with an enterprise organization. The enterprise application host platform(s) may be configured to provide various enterprise and/or back-office computing functions for an enterprise organization. The enterprise application host platform(s) may comprise various servers and/or databases that store and/or otherwise maintain account information, such as financial/membership account information including account balances, transaction history, account owner information, and/or other information corresponding to one or more users (e.g., external users). The enterprise application host platform(s) may process and/or otherwise execute transactions on specific accounts based on commands and/or other information received from other computer systems comprising the computing environment 100. The enterprise application host platform(s) may receive data from the security platform 105, manipulate and/or otherwise process such data, and/or return processed data and/or other data to the security platform 105 and/or to other computer systems in the computing environment 100.

The enterprise user computing device may be a personal computing device (e.g., desktop computer, laptop computer) or mobile computing device (e.g., smartphone, tablet). The enterprise user computing device may be linked to and/or operated by a specific enterprise user (who may, e.g., be an employee or other affiliate of an enterprise organization).

The administrator computing device may be a personal computing device (e.g., desktop computer, laptop computer) or mobile computing device (e.g., smartphone, tablet). The administrator computing device may be linked to and/or operated by an administrative user (who may, e.g., be a network administrator of an enterprise organization). The administrator computing device may receive data from the security platform 105, manipulate and/or otherwise process such data, and/or return processed data and/or other data to the security platform 105 and/or to other computer systems in the computing environment 100. The administrator computing device may be configured to control operation of the security platform 105.

The application(s) 130 may comprise transaction processing programs, user servicing programs, and/or other programs associated with an enterprise organization. The application(s) 130 may correspond to applications that provide various enterprise and/or back-office computing functions for an enterprise organization. The application(s) 130 may correspond to applications that facilitate storage, modification, and/or maintenance of account information, such as financial/membership account information including account balances, transaction history, account owner information, and/or other information corresponding to one or more users (e.g., external users). The application(s) 130 may process and/or otherwise execute transactions on specific accounts based on commands and/or other information received from other computer systems comprising the computing environment 100. The application(s) 130 may operate in a distributed manner across multiple computing devices (e.g., the computing device(s) 110) and/or servers, operate on a single computing device and/or server. The application(s) 130 may be used for execution of various operations corresponding to the one or more computing devices (e.g., the computing device(s) 110) and/or servers.

The storage device(s) 120 may comprise various memory devices such as hard disk drives, solid state drives, magnetic tape drives, or other electronically readable memory, and/or the like. The storage device(s) 120 may be used to store data corresponding to operation of one or more applications within the private network 150 (e.g., the application(s) 130), and/or computing devices (e.g., the computing device(s) 110). The storage device(s) 120 may receive data from the security platform 105, store the data, and/or transmit the data to the security platform 105 and/or to other computing systems in the computing environment 100.

The private network(s) 160 may have an architecture similar to an architecture of the private network 150. The private network 160 may correspond to, for example, another enterprise organization that communicates data with the private network 150. The private network 150 may also be linked to the public network 170. The public network 170 may comprise external computing device(s) 180. The external computer device(s) 180 may be a personal computing device (e.g., desktop computer, laptop computer) or mobile computing device (e.g., smartphone, tablet). The external computer device(s) 180 may be linked to and/or operated by a user (who may, e.g., be a client or an affiliate or an employee) of an enterprise organization associated with the private network 150 and who may interact with one or more enterprise resources while using a device located outside of an enterprise firewall.

The security platform 105, the computing device(s) 110, the external computing device(s) 180, and/or one or more other systems/devices in the computing environment 100 may be any type of computing device capable of receiving input via a user interface, and communicating the received input to one or more other computing devices. The security platform 105, the computing device(s) 110, the external computing device(s) 180, and/or the other systems/devices in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the security platform 105, the computing device(s) 110, the storage device(s) 120, and/or other systems/devices in the computing environment 100 may be, in some instances, special-purpose computing devices configured to perform specific functions.

Referring to FIG. 1B, the security platform 105 may comprise one or more of host processor(s) 106, memory 107, medium access control (MAC) processor(s) 108, physical layer (PHY) processor(s) 109, transmit/receive (TX/RX) module(s) 109-1, or the like. One or more data buses may interconnect host processor(s) 106, memory 107, MAC processor(s) 108, PHY processor(s) 109, and/or Tx/Rx module(s) 109-1. The security platform 105 may be implemented using one or more integrated circuits (ICs), software, or a combination thereof, configured to operate as discussed below. The host processor(s) 106, the MAC processor(s) 108, and the PHY processor(s) 109 may be implemented, at least partially, on a single IC or multiple ICs. Memory 107 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 108 and/or the PHY processor(s) 109 of the security platform 105 are configured to generate data units, and process received data units, that conform to any suitable wired and/or wireless communication protocol. For example, the MAC processor(s) 108 may be configured to implement MAC layer functions, and the PHY processor(s) 109 may be configured to implement PHY layer functions corresponding to the communication protocol. The MAC processor(s) 108 may, for example, generate MAC data units (e.g., MAC protocol data units (MPDUs)), and forward the MAC data units to the PHY processor(s) 109. The PHY processor(s) 109 may, for example, generate PHY data units (e.g., PHY protocol data units (PPDUs)) based on the MAC layer data units. The generated PHY data units may be transmitted via the TX/RX module(s) 109-1 over the private network 150 and/or the public network 160. Similarly, the PHY processor(s) 109 may receive PHY data units from the TX/RX module(s) 109-1, extract MAC layer data units encapsulated within the PHY data units, and forward the extracted MAC data units to the MAC processor(s). The MAC processor(s) 108 may then process the MAC data units as forwarded by the PHY processor(s) 109.

One or more processors (e.g., the host processor(s) 106, the MAC processor(s) 108, the PHY processor(s) 109, and/or the like) of the security platform 105 are configured to execute machine readable instructions stored in memory 107. Memory 107 may comprise (i) one or more program modules/engines having instructions that when executed by the one or more processors cause the security platform 105 to perform one or more functions described herein, and/or (ii) one or more databases that may store and/or otherwise maintain information which may be used by the one or more program modules/engines and/or the one or more processors. The one or more program modules/engines and/or databases may be stored by and/or maintained in different memory units of the security platform 105 and/or by different computing devices that may form and/or otherwise make up the security platform 105. For example, memory 107 may have, store, and/or comprise a security engine 107-1, and a security database 107-2. The security engine 107-1 may have instructions that direct and/or cause the security platform 105 to perform one or more operations, as discussed in greater detail below. The security database 107-2 may store user information corresponding to users operating within the computing environment 100, and/or other information to be used for determination of confidential data. The security database 107-2 may be utilized by the host processor(s) 106 to identify confidential data, and to encrypt the confidential data, as discussed in greater detail below. The security database 107-2 may be updated based on training messages and other messages, as discussed in greater detail below While FIG. 1A illustrates the security platform 105 as being separate from other elements connected in the private network 150, in one or more other arrangements, the security platform 105 may be included in one or more of the computing device(s) 110, and/or other device/servers associated with the private network 150. Elements in the security platform 105 (e.g., host processor(s) 105, memory(s) 107, MAC processor(s) 108, PHY processor(s) 109, and TX/RX module(s) 109-1, one or more program modules and/or stored in memory(s) 107) may share hardware and/or software elements with and corresponding to, for example, one or more of the computing device(s) 110, and/or other device/servers associated with the private network 150.

Figure 2:
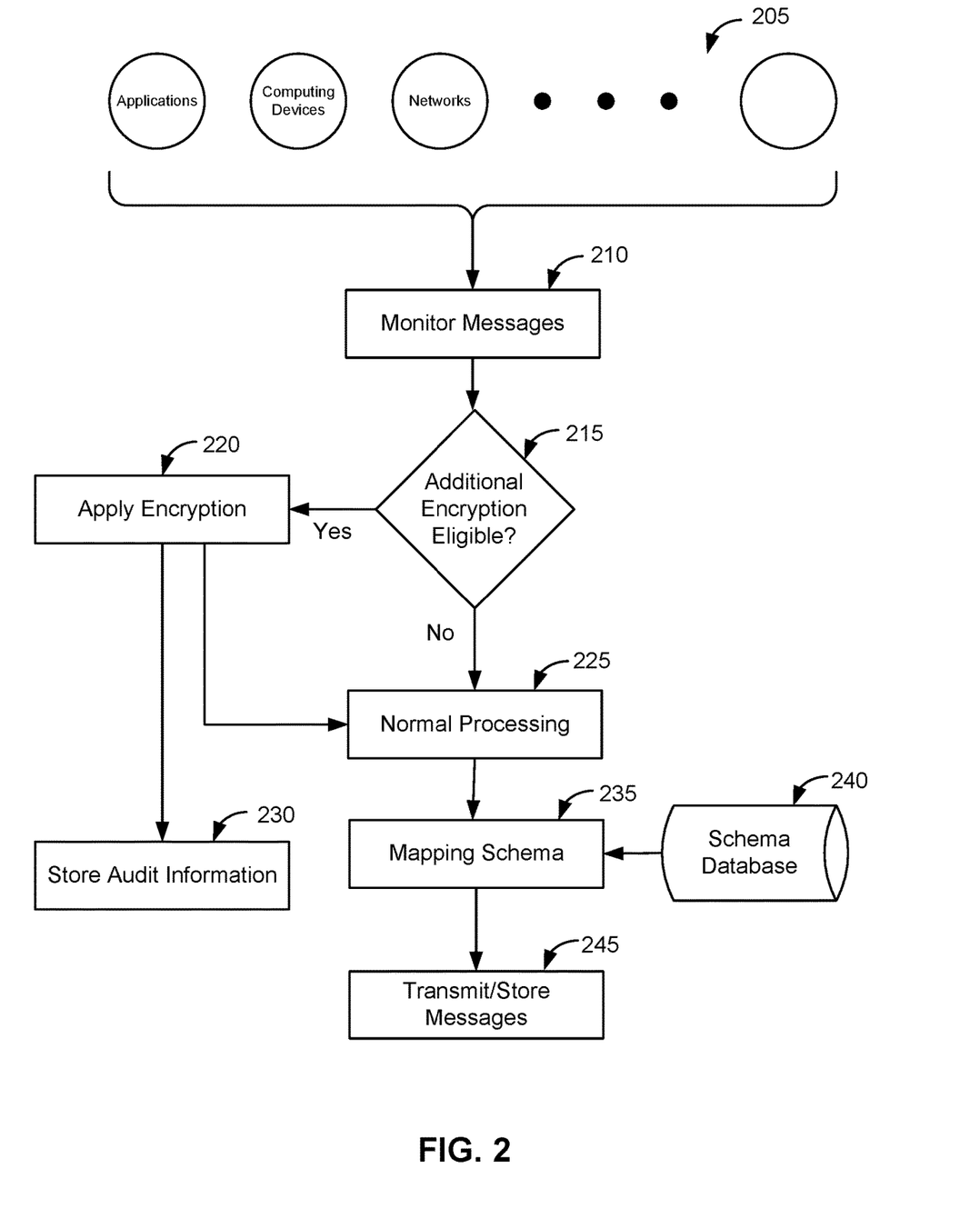
FIG. 2 depicts an illustrative event sequence for identification of confidential data within a message and encrypting the confidential data at a security platform, in accordance with one or more example arrangement.

FIG. 2 depicts an illustrative event sequence for identification of confidential data within a message and encrypting the confidential data at a security platform, in accordance with one or more example arrangements. The illustrative event sequence is described with reference to the computing environment 100 merely as an example. In other arrangements, the illustrative event sequence occurs in a computing environment different from the computing environment 100. The illustrative event sequence may be executed, for example, using the security platform 105.

At block 210, the security platform 105 may identify confidential information within messages transmitted between different systems 205 (e.g., computing devices, applications operating in the computing devices, computing networks, storage devices, or the like). An adaptive filter, within the security platform 105, for example, analyzes messages being transmitted across different systems, or within a system, in the computing environment and identifies confidential information within the messages. The confidential information may correspond to non-public information (NPI), material non-public information (MNPI), highly restricted confidential information (HRCI), personally identifiable information (PII), or the like.

The adaptive filter may operate in a semi-supervised manner. The adaptive filter may, for example, utilize machine learning based techniques to identify confidential information within messages. The adaptive filter may be trained to identify confidential information using training messages. A training message may be tagged as comprising confidential information and transmitted to the adaptive filter. A header of the training message may comprise, for example, one or more indicators indicating that: (i) the training message comprises confidential information, (ii) a location of the confidential information within the training message, (iii) a number of bits of the confidential information, and/or the like. The adaptive filter may determine that the training message comprises confidential information based on the one or more indicators, and may record characteristics corresponding to the confidential information. The adaptive filter may record, for example, one or more of: a pattern of digits corresponding to the confidential information, a number of digits comprising the confidential information, a classification of the confidential information, a data source system of the confidential information, a data destination system of the confidential information, a data type of the confidential information, a format of the confidential information, meta information corresponding to the confidential information, a data structure corresponding to the confidential information, a document format corresponding to the confidential information, and/or the like. The adaptive filter may store recorded information, corresponding to the confidential information, in a knowledge base (e.g., in the security database 107-2). The adaptive filter may use the recorded information, in the knowledge base, to identify confidential information in later messages.

The adaptive filter may receive a first message from a data source system (e.g., a computing device, an application operating in a computing device, a computing network, a storage device, or the like). The adaptive filter may use the knowledge base to identify confidential information in a received message (e.g., a message received after receiving one or more training messages). The adaptive filter, for example, may use a linear regression model based on the knowledge base to identify confidential information in a message. The adaptive filter may, for example, identify a portion of a message as comprising confidential information, for example, based on a context, a model, a classification, file type, data structure, and/or the like, corresponding to the portion of the message.

The adaptive filter may identify information in a portion of the first message as confidential information, for example, if the information in the portion is similar to or the same as previously identified confidential information (e.g., in training messages or regular messages). The adaptive filter may determine that the information in the portion is similar to previously identified confidential information, for example, if the information in the portion shares one or more characteristics with the previously identified confidential information. The adaptive filter may further update the knowledge base based on identified information in the first message. The adaptive filter may use the updated knowledge base to determine confidential information in future messages.

The adaptive filter may determine, for example, based on a training message, that a particular sequence of digits corresponds to confidential information. The adaptive filter may determine, based on the particular sequence of digits, other sequences of digits as corresponding to confidential information. The other sequences of digits may, for example, share a same format and/or a same pattern with the particular sequence of digits. The adaptive filter may update the knowledge base with the other sequences of digits, and use the updated knowledge base to determine confidential information in future messages.

The adaptive filter may identify information in a portion of the first message as confidential information, for example, if information in the portion is an updated version of previously identified confidential information (e.g., in training messages or regular messages). The adaptive filter may identify a 15-digit number corresponding to a PII parameter, in a message, as confidential information if for example, a previous version of the PII parameter, that comprised only 9 digits, was previously identified as confidential information. The adaptive filter may further update the knowledge base based on newly identified confidential information (e.g., the 15-digit PII parameter) in the message. The adaptive filter may use the updated knowledge base to determine confidential information in future messages.

The adaptive filter may identify information in a portion of the first message as confidential information, for example, if information in the portion is associated with previously identified confidential information (e.g., in training messages or regular messages). The adaptive filter may identify a portion of the first message, corresponding to a first user, as confidential information, for example, if information corresponding to a second user, associated with the first user, was previously classified as confidential information.

The adaptive filter may, for example, determine confidential information in the first message based on an indicator (e.g., in a header of the message), wherein the indicator indicates that the message comprises confidential information. The indicator may indicate, for example, a location of the confidential information within the message, a number of bits of the confidential information, and/or the like.

At block 215, the security platform 105 may determine a first portion of the first message that is eligible for encryption. The first portion of the first message is eligible for encryption, for example, if the adaptive filter determines that (i) the first portion of the first message comprises confidential information, and (ii) the first portion of the first message is not encrypted, or is currently encrypted below a threshold level of encryption. The security platform 105 may further determine a second portion of the first message that is not eligible for encryption. The second portion of the first message is not eligible for additional encryption, for example, if the adaptive filter determines that (i) the second portion of the first message does not comprise confidential information, or (ii) the second portion of the first message comprises confidential information, but is currently encrypted at, or above, a threshold level of encryption. A threshold level of encryption may be determined based on factors such as types of data (e.g., in the first portion and/or the second portion), the data source system transmitting the first message, a data destination system corresponding to the first message, an administrator setting, available processing/memory resources, and/or the like.

At block 220, the security platform 105 (e.g., an adaptive handler in the security platform 105) may apply encryption to the first portion of the first message, that is determined to be eligible for encryption, to generate an encrypted first portion. The security platform 105, for example, may not apply any encryption to the second portion of the first message. The security platform 105 may apply encryption based on for example, a data type corresponding to the first portion of the first message. The security platform 105 may apply, for example, bit-by-bit encryption to the first portion of the first message. The security platform 105 may apply, for example, a one-way encryption technique, a two-way encryption technique, an alternate bit encryption technique, or the like. Applying encryption to only the first portion of the first message rather than the entire first message may improve (e.g., increase efficiency, reduce latency, and/or improve other parameters) encoding and transmission performance of a transmitting system, and decoding and processing performance of a receiving system.

The security platform 105 may determine an encryption level to be used for the confidential information. The security platform 105 may select, for example, an encryption technique, from a plurality of encryption techniques based on (i) time required to encrypt the first portion of the first message and/or (ii) resources (e.g., processing power, memory resources, and/or the like) currently available at the security platform 105. The security platform 105 may select an encryption technique that provides at least a threshold level of encryption, while also taking into considering a level available resources (e.g., at the security platform 105). The threshold level of encryption may be determined based on factors such as a type of data to be encrypted, the data source system transmitting the first message, a data destination system corresponding to the first message, an administrator setting, available processing/memory resources, and/or the like.

At block 225, the security platform 105 may proceed with normal processing of the encrypted first portion and the second portion of the first message. The security platform 105 may combine the encrypted first portion and the second portion of the first message to generate a second message. The security platform 105 may further update a header corresponding to the second message. The security platform 105 may indicate, in the header (e.g., using one or more bits) and/or use any other signaling technique to indicate one or more of: an encryption technique used in the encrypted first portion, a number of bits in the encrypted first portion, a number of bits in the first portion of the first message, a location of the encrypted first portion (e.g., within the second message), meta information corresponding to the second message, and/or the like. The security platform 105 may further encrypt the header of the second message using an appropriate encryption technique. A data destination system receiving the second message may decrypt the header of the new message using a private key. The security platform 105 may, for example, use quantum key distribution (QKD) to share the private key with the system receiving the second message.

Encryption and processing of the first message may comprise using enrichment information. Enrichment information may correspond to any information that may be added to the first message, or the first portion of the first message, during encryption and/or processing (e.g., by the security platform 105, or any other system in the computing environment 100). In an example wherein a data source system only transmits, in the first portion of the first message, a postal code (e.g., a ZIP code) and a first line of an address corresponding to a user, the enrichment information may be city and state information, corresponding to the address, that may be added to the first portion of the first message. Enrichment information may correspond to any information that may be used to generate a parameter in the first portion of the first message (e.g., by the security platform 105, or by any other system in the computing environment 100). The enrichment information may comprise temporary information that may be used to generate a parameter in the first portion of the first message. The enrichment information may comprise a temporary value, for example, if the first portion of the first message comprises a parameter that is calculated based on the temporary value. Encryption of the first portion of the first message may comprise adding the enrichment information to the first portion of the message, and encrypting the first portion of the first message and the enrichment information to generate the encrypted first portion.

At block 235, the security platform 105 may apply a mapping schema based on data in the encrypted first portion. Applying a mapping schema may comprise, for example, generating one or more indicators, associated with information in the encrypted first portion, and applying the one or more indicators to the second message. The one or more indicators may be used (e.g., at a data destination system receiving the second message) for identifying contents and/or meta information corresponding to the first portion of the first message and/or the encrypted first portion. The one or more indicators may be inserted, for example, in the header of the second message. The security platform 105 may, for example, insert a schema identifier (e.g., a schema ID) that indicates one or more of: the data source system of the first message, a data destination system of the second message, a format corresponding to the first portion of the first message (e.g., as received from the data source system), a format corresponding to the encrypted first portion, and/or enrichment information that may be used to generate the encrypted first portion, and/or included in the encrypted first portion. The schema ID may indicate one or more properties and/or values corresponding to the enrichment information added to/used in the first message. The schema ID may indicate, for example, (i) a length of the enrichment information, (ii) a type of the enrichment information, (iii) a format of the enrichment information, (iv) a location of the enrichment information in the first portion/encrypted first portion, (v) a value of the enrichment information, and/or the like.

The schema ID may enable the security platform 105 to identify, for example, encrypted information in messages previously processed and encrypted by the security platform 105, and stored in the storage device(s) 120. The security platform 105 may, for example, retrieve a message from the storage device(s) 120, wherein the message comprises an encrypted portion of the message. The security platform 105 may use a schema ID in the retrieved message to identify (i) a data source system corresponding to the retrieved message, (ii) a data destination system corresponding to the retrieved message, (iii) formats corresponding to an encrypted portion of the retrieved message (e.g., a format prior to processing and encryption at the security platform 105, a format of the encrypted portion), and/or (iv) enrichment information that may be used to generate the encrypted portion and/or included in the encrypted portion, and/or the like.

A schema database 240 may store information (e.g., system identifiers, data formats, enrichment information types, or the like) corresponding to different systems and types of messages transmitted within the computing environment 100. The mapping schema 235 may use the schema database 240 to determine a schema ID to be inserted in the new message. The schema database 240 may be based on the knowledge base used by the adaptive filter, and may be updated based on updating of the knowledge base (e.g., during operation of the adaptive filter).

At block 230, the security platform 105 may store audit information (e.g., in an audit store) corresponding to encryption (e.g., as applied in block 220). The audit information may comprise information corresponding to one or more of: data type(s) corresponding to the first portion of the message that was encrypted, a location where encryption details were stored (e.g., in a storage device within the computing environment 100), information on how to retrieve the encryption details, type of encryption used, and/or the like.

Audit information in the audit store may be used to keep a track of operation of the adaptive handler in the security platform 105. Audit information in the audit store may be used to determine, for example, if an appropriate level of encryption was applied to a particular data type. A security administrator may use the audit information, for example, to determine if further training messages are required. Further training messages may be required, for example, if information in the audit store indicates that confidential information was not encrypted to an appropriate level of encryption. The further training messages may enable the security platform 105 to correctly identify messages eligible for encryption, and apply an appropriate level of encryption.

At block 245, the security platform 105 may transmit the new message to one or more one or more data destination systems (e.g., computing devices, applications operating in one or more computing devices, computing networks, storage devices, or the like). The security platform 105 may, for example, transmit the new message for storage at a storage device (e.g., the storage device(s) 120). The security platform 105 may, for example, transmit the new message to a computing device (e.g., the computing device(s) 110) for further processing.

The security platform 105 may scan messages stored in various databases associated with the computing environment 100 (e.g., the storage device(s) 120) to identify confidential information that is unencrypted or encrypted below a threshold level of encryption. The security platform 105 may identify confidential information, encrypt, and process the messages (e.g., using one or more techniques described with reference to FIG. 2).

Figure 3:
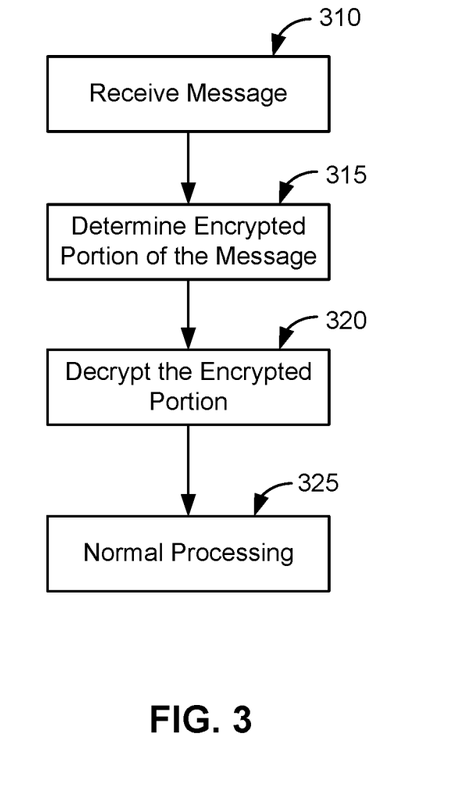
FIG. 3 depicts an illustrative event sequence for decrypting encrypted confidential data in a message, in accordance with one or more example arrangements.

FIG. 3 depicts an illustrative event sequence for decrypting encrypted confidential data in a message, in accordance with one or more example arrangements. The illustrative event sequence is described with reference to the computing environment 100 merely as an example. In other embodiments, the illustrative event sequence occurs in a computing environment different from the computing environment 100. The illustrative event sequence may be executed, for example, using the security platform 105.

At block 310, the security platform 105 may receive a message. The security platform 105 may, for example, retrieve a message stored in the storage device(s) 120. The message may correspond to a message previously received by the security platform 105, from a data source system, and processed, encrypted, and stored in the storage device(s) 120. The message may comprise, for example, a first portion of the message and a second portion of the message. The first portion of the message, for example, may be encrypted, and the second portion of the message may be unencrypted. The first portion of the message may be encrypted based on one or more techniques described with respect to FIG. 2. The message may further comprise a header (e.g., a self-executing header). The security platform 105 may, for example, based on the self-executing header, request a private key corresponding to the message. The security platform 105 may, based on the private key, decrypt the header corresponding to the message. The header may indicate one or more of: an encryption technique used in the first portion of the message, a number of bits in the first portion of the message, a location of the first portion of the message, meta information corresponding to the message, a schema ID corresponding to the message, and/or the like.

At block 315 and based on information retrieved from the header, the security platform 105 may determine the first portion of the message that is encrypted. The security platform 105 may determine (e.g., based on information retrieved from the header) a number of bits in the first portion of the message and a location of the first portion of the message.

At block 320, based on information retrieved from the header, the security platform 105 may decrypt the first portion of the message to generate a decrypted first portion of the message. The security platform 105 may, for example, determine an encryption technique used in the first portion of the message based on information retrieved from the header. The security platform 105 may, for example, decrypt the first portion of the message based on the determination of the encryption technique used in the first portion of the message.

At block 325, the security platform 105 may process the decrypted first portion of the message. The security platform 105 may identify information in the decrypted first portion of the message based on, for example, a mapping schema associated with the first portion of the message. The security platform 105 may identify the information based on a schema ID (e.g., in the header). The security platform 105 may, for example, determine one or more of: ((i) a data source system corresponding to the message, (ii) a data destination system corresponding to the message, (iii) a format corresponding to an unencrypted first portion of the message, (iv) a format corresponding to the first portion of the message, and/or (iv) enrichment information that may be used to generate the first portion and/or included in the first portion, and/or the like. The security platform 105 may use a schema database to identify, based on the schema ID, the information in the decrypted first portion of the message.

Figure 4:
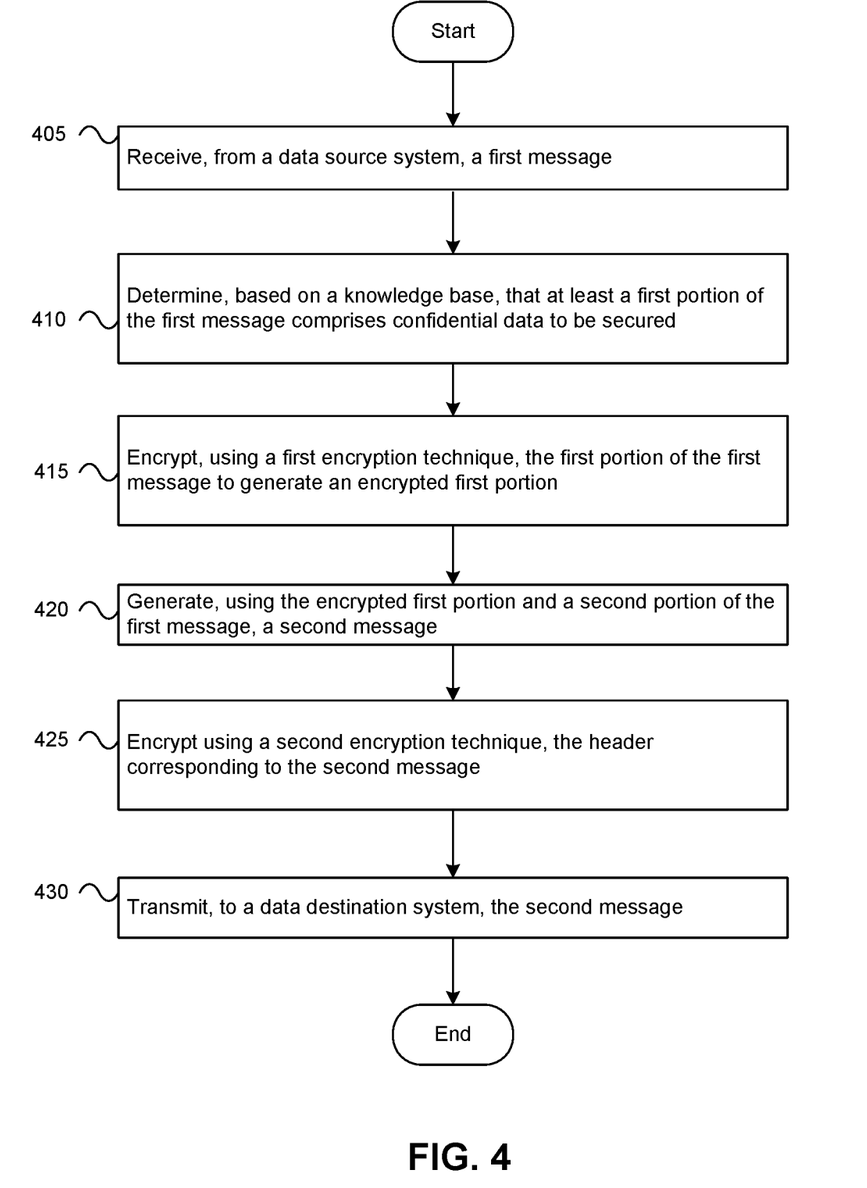
FIG. 4 shows an illustrative method for identification of confidential data within a message, encrypting the confidential data, and transmitting the confidential data in accordance with one or more example arrangements.

FIG. 4 shows an illustrative method for identification of confidential data within a message, encrypting the confidential data, and transmitting the confidential data in accordance with one or more example arrangements. Referring to FIG. 4, at step 405, a computing platform comprising at least one processor, a communication interface, and memory may receive, via the communication interface and from a data source system, a first message. The first message may comprise a first portion of the first message and a second portion of the message.

At step 410, the computing platform may determine, based on a knowledge base, that at least the first portion of the first message comprises confidential data that is eligible for encryption. The computing platform may further determine, based on a knowledge base, that at least the second portion of the first message comprises data that is not eligible for encryption. The computing platform may utilize one or more techniques described with reference to block 215 to perform the comparison.

At step 415, the computing platform may, encrypt, using a first encryption technique, the first portion of the first message to generate an encrypted first portion. The computing platform may, for example, use a bit-by-bit encryption technique to encrypt the first portion of the first message.

At step 420, the computing platform may generate a second message. The computing platform may generate the second message, for example, by using the encrypted first portion and the second portion of the first message. The computing platform may update a header corresponding to the second message to indicate the first encryption technique as used in the first portion. At step 425, the computing platform may encrypt using a second encryption technique, the header corresponding to the second message. At step 435, the computing platform may transmit, via the communication interface and to a data destination system, the second message. In various arrangements, the computing platform may correspond to the security platform 105 described above with reference to FIGS. 1A, 1B, 2, and/or 3, or any other device that performs functions corresponding to FIG. 4.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive a training message;
      determine, based on an indicator in the training message, that at least a portion of the training message comprises first confidential data that is eligible for encryption;
      determine one or more first characteristics of the first confidential data, wherein the one or more first characteristics comprise a data type of the first confidential data;
      update a knowledge base with the one or more first characteristics;
      receive, via the communication interface and from a data source system, a first message, wherein the first message comprises a first portion of the first message and a second portion of the first message;
      determine, based on the knowledge base, that at least the first portion of the first message comprises second confidential data that is eligible for encryption, wherein the determining that at least the first portion of the first message comprises second confidential data that is eligible for encryption is based on determining that a data type of the second confidential data is the same as the data type of the first confidential data;
      encrypt, using a first encryption technique and based on determining that at least the first portion of the first message comprises the second confidential data that is eligible for encryption, the first portion of the first message to generate an encrypted first portion;
      generate, using the encrypted first portion and the second portion of the first message, a second message, wherein generating the second message comprises generating a header corresponding to the second message, wherein the header comprises a first indicator of the first encryption technique;
      encrypt using a second encryption technique, the header corresponding to the second message; and
      transmit, via the communication interface and to a data destination system, the second message.

2. The computing platform of claim 1, wherein the one or more first characteristics further comprise one or more of:
   a data source system corresponding to the portion of the training message;
   a data destination system corresponding to the portion of the training message;
   a format corresponding to the portion of the training message; and
   a classification of corresponding to the portion of the training message.

3. The computing platform of claim 1, wherein the determining that the first portion of the first message comprises the second confidential data that is eligible for encryption comprises:
   determining one or more second characteristics of the first portion of the first message; and
   determining that at least one second characteristic is similar to at least one first characteristic,
   wherein the memory stores additional computer-readable instructions that, when executed by the at least one processor, cause the computing platform to update the knowledge base with the at least one second characteristic.

4. The computing platform of claim 1, wherein the determining that the first portion of the first message comprises the second confidential data that is eligible for encryption comprises:
   determining one or more second characteristics of the first portion of the first message;
   determining that at least one second characteristic is an updated version of at least one first characteristic,
   wherein the memory stores additional computer-readable instructions that, when executed by the at least one processor, cause the computing platform to update the knowledge base with the at least one second characteristic.

5. The computing platform of claim 1, wherein the determining, that at least the first portion of the first message comprises the second confidential data that is eligible for encryption comprises at least one of:
   determining that the first portion of the first message comprises a pattern of bits; and
   determining that the first message comprises a second indicator, wherein the second indicator indicates that the first portion of the first message comprises the second confidential data.

6. The computing platform of claim 5, wherein the knowledge base comprises one or both of the pattern of bits and the second indicator.

7. The computing platform of claim 1, wherein determining that at least the first portion of the first message comprises the second confidential data that is eligible for encryption comprises determining that the first portion of the first message is encrypted below a threshold level of encryption.

8. The computing platform of claim 1, wherein the data source system is different from the data destination system.

9. The computing platform of claim 1, wherein encrypting the first portion of the first message comprises:
   determining, a level of encryption to be applied; and
   encrypting the first portion of the first message based on the determined level of encryption.

10. The computing platform of claim 1, wherein the first encryption technique is the same as the second encryption technique.

11. The computing platform of claim 1, wherein the second message comprises a second indicator corresponding to the first portion of the first message, wherein the second indicator indicates at least one of: the data source system of the first message, the data destination system of the second message, a format of the first portion of the first message, and a format of the encrypted first portion.

12. The computing platform of claim 11, wherein transmitting, to the data destination system, the second message comprises transmitting the second message for storage at a storage device, wherein the memory stores additional computer-readable instructions that, when executed by the at least one processor, cause the computing platform to:
retrieve, via the communication interface, the second message from the storage device;
decrypt the header corresponding to the second message, wherein decrypting the header comprises determining, based on the first indicator, the first encryption technique;
decrypt, based on the first indicator, the encrypted first portion to generate a decrypted first portion; and
determine, based on the second indicator, at least one of: the data source system of the first message, the data destination system of the second message, the format of the first portion of the first message, and the format of the encrypted first portion.

13. The computing platform of claim 11, wherein encrypting the first portion of the first message comprises:
adding enrichment information to the first portion of the first message, wherein encrypting the first portion of the first message comprises encrypting the first portion of the first message and the enrichment information to generate the encrypted first portion.

14. The computing platform of claim 13, wherein the second indicator further indicates at least one of: a length of the enrichment information, a type of the enrichment information, a format of the enrichment information, a location of the enrichment information in the first portion of the first message, and a value of the enrichment information.

15. A method, comprising:
at a computing platform comprising at least one processor, a communication interface, and memory:
receiving a training message;
determining, based on an indicator in the training message, that at least a portion of the training message comprises first confidential data that is eligible for encryption;
determining one or more first characteristics of the first confidential data, wherein the one or more first characteristics comprise a data type of the first confidential data;
updating a knowledge base with the one or more first characteristics;
receiving, via the communication interface, a first message, wherein the first message comprises a first portion of the first message and a second portion of the first message;
determining, based on the knowledge base, that at least the first portion of the first message comprises second confidential data that is eligible for encryption, wherein the determining that at least the first portion of the first message comprises second confidential data that is eligible for encryption is based on determining that a data type of the second confidential data is the same as the data type of the first confidential data;
encrypting, using a first encryption technique and based on determining that at least the first portion of the first message comprises the second confidential data that is eligible for encryption, the first portion of the first message to generate an encrypted first portion;
generating, using the encrypted first portion and the second portion of the first message, a second message, wherein generating the second message comprises generating a header corresponding to the second message, wherein the header comprises a first indicator of the first encryption technique;
encrypting using a second encryption technique, the header corresponding to the second message; and
transmitting, via the communication interface, the second message.

16. The method of claim 15, wherein determining that the first portion of the first message comprises the second confidential data that is eligible for encryption comprises:
determining one or more second characteristics of the first portion of the first message; and
determining that at least one second characteristic is similar to at least one first characteristic,
wherein the memory stores additional computer-readable instructions that, when executed by the at least one processor, cause the computing platform to update the knowledge base with the at least one second characteristic.

17. The method of claim 15, wherein the second message comprises a second indicator corresponding to the first portion of the first message, wherein the second indicator indicates at least one of: a data source system of the first message, a data destination system of the second message, a format of the first portion of the first message, and a format of the encrypted first portion, wherein transmitting the second message comprises transmitting the second message for storage at a storage device, wherein the method further comprises:
retrieving the second message from the storage device;
decrypting the header corresponding to the second message, wherein decrypting the header comprises determining, based on the first indicator, the first encryption technique;
decrypting, based on the first indicator, the encrypted first portion to generate a decrypted first portion;
determine, based on the second indicator, at least one of: the data source system of the first message, the data destination system of the second message, the format of the first portion of the first message, and the format of the encrypted first portion.

18. One or more non-transitory computer-readable media storing instructions that, when executed by a computing platform comprising at least one processor, a communication interface, and memory, cause the computing platform to:
receive a training message;
determine, based on an indicator in the training message, that at least a portion of the training message comprises first confidential data that is eligible for encryption;
determine one or more first characteristics of the first confidential data, wherein the one or more first characteristics comprise a data type of the first confidential data;
update a knowledge base with the one or more first characteristics;

receive, via the communication interface, a first message, wherein the first message comprises a first portion of the first message and a second portion of the first message;

determine, based on the knowledge base, that at least the first portion of the first message comprises second confidential data that is eligible for encryption, wherein the determining that at least the first portion of the first message comprises second confidential data that is eligible for encryption is based on determining that a data type of the second confidential data is the same as the data type of the first confidential data;

encrypt, using a first encryption technique and based on determining that at least the first portion of the first message comprises the second confidential data that is eligible for encryption, the first portion of the first message to generate an encrypted first portion;

generate, using the encrypted first portion and the second portion of the first message, a second message, wherein generating the second message comprises generating a header corresponding to the second message, wherein the header comprises an indicator of the first encryption technique;

encrypt using a second encryption technique, the header corresponding to the second message; and transmit, via the communication interface, the second message.

19. The method of claim 15, wherein the one or more first characteristics further comprise one or more of:
a data source system corresponding to the portion of the training message;
a data destination system corresponding to the portion of the training message;
a format corresponding to the portion of the training message; and
a classification of corresponding to the portion of the training message.

20. The one or more non-transitory computer-readable media of claim 18, wherein the one or more first characteristics further comprise one or more of:
a data source system corresponding to the portion of the training message;
a data destination system corresponding to the portion of the training message;
a format corresponding to the portion of the training message; and
a classification of corresponding to the portion of the training message.

* * * * *